UNITED STATES PATENT OFFICE.

WILLIAM A. O. WUTH, OF PITTSBURG, PENNSYLVANIA.

MANUFACTURE OF STEEL BY THE OPEN-HEARTH PROCESS.

SPECIFICATION forming part of Letters Patent No. 279,473, dated June 12, 1883.

Application filed September 11, 1879.

*To all whom it may concern:*

Be it known that I, W. A. OTTO WUTH, of Pittsburg, in the county of Allegheny and State of Pennsylvania, have invented a new and useful Improvement in the Manufacture of Steel by the Open-Hearth Process; and I do hereby declare the following to be a full, clear, and exact description thereof.

The process of making steel from molten cast-iron, which is commonly known as the "Siemens-Martin" or "open-hearth" process, consists in the melting of a charge of blast-furnace metal, or pig-iron, on the hearth of a reverberatory furnace (preferably a Siemens furnace) at a heat nearly approaching to that of melted wrought-iron, and then decarburizing the bath of metal by introducing cemented ore, puddled iron or steel scrap, wrought-iron, or ore in any convenient form; and when the bath of metal has become nearly decarburized, approaching to the condition of melted wrought-iron, it is recarburized more or less, according to the grade of steel desired to be produced, by the addition of spiegeleisen or ferro-manganese. This process is so well known to those skilled in the manufacture of iron and steel that it is needless to give a more particular description of it. In the use of this process a practical difficulty occurs, arising from the presence of sulphur and phosphorus in the pig metal, which it is found impossible to avoid when the pig metal used is the product of the blast-furnace, and when the metal is contaminated with these foreign matters it is both difficult and expensive to remove them.

The prevention of this difficulty is the object of my invention, which consists in the use of a bath of factitious pig metal made from wrought-iron or other decarburized or non-carburized iron, and substantially free from phosphorus and sulphur, and subsequently recarburizing the pig-metal bath, after it has been decarburized in the usual way, by the addition of the requisite amount of the same factitious pig metal. Thus both the pig metal which is decarburized and that which is used for recarburizing being free from the contamination of sulphur and phosphorus, the steel manufactured by my process is superior to that made by the open-hearth process with the use of ordinary blast-furnace metal, while the recarburization, being effected without the use of spiegeleisen, is better for being free from manganese. My process has also the advantage of being cheaper than the ordinary open-hearth process.

The factitious pig metal which I employ may be made from muck-bar, puddle-ball, scrap-iron, or any description of manufactured iron having a low percentage of carbon. I prefer, however, to use the blooms made directly from iron ore by the process invented by Siemens, in which iron ore mixed with carbon and lime is subjected to a high heat and deoxidized in a revolving furnace. The deoxidized iron thus produced, not having been subjected to the contamination of the fuel in the blast-furnace, is substantially free from sulphur and phosphorus, excepting what is contained in the cinder, which may be sufficiently removed by hammering. It is not, however, ordinarily useful for working into wrought-iron, because it disintegrates under the action either of the squeezer or of the rolls, even after having been hammered.

The iron from which the factitious pig is to be made is charged into an ordinary cupola with sufficient carbon (for which purpose coke will answer) to melt the metal. When melted it is run into pigs, or into molds of any desired shape and size. The factitious pig metal thus obtained is then introduced into the hearth of a suitable reverberatory furnace capable of maintaining a sufficient heat to keep the metal in fusion at the latter stage of the process. For this purpose a Siemens gas-furnace is ordinarily used, and is preferred. In this furnace the pig metal is melted. It is then decarburized by introducing successive charges of wrought-iron in the shape of muck-bar, scrap-iron, or the Siemens' bloom, before referred to. It is not necessary for me to indicate the relative quantity of wrought-iron or Siemens' bloom to be used for the decarburization of the pig, as this depends on the amount of carbon in the bath, and is well understood by all who are skilled in the art. When the pig-metal bath is thus decarburized it may, if preferred, be recarburized by the addition of spiegeleisen; but as the presence of manganese is not ordinarily desirable I prefer to recarburize by the use of the same kind of factitious pig metal as that used for the bath. Ordinary pig metal would of course be unfit for this purpose, owing to the presence of silicon and phosphorus, but principally the former, which fact has led to the use of spiegeleisen for this purpose. The amount of the recarburizing metal to be used will depend, of course, upon the percentage of carbon in the recarburizer and the grade of steel to be produced.

Any phosphorus which may exist in the iron ore from which the Siemens' blooms are made will unite with the cinder. It is therefore desirable to remove the cinder as much as possible, which may be effected almost entirely by hammering the iron while hot, for, as before stated, the blooms thus made are susceptible of hammering, although the iron is not sufficiently tenacious to hold together if passed through a squeezer or a pair of rolls. I do not employ an air-blast for decarburizing the bath, and in this respect my process differs from any process which has preceded it and in which an artificial pig was used.

By a "factitious" pig I mean a carburet of iron, practically free from silicon, sulphur, and phosphorus, produced by carbureting the metal after it has been first decarburized, and preferably produced by the method hereinbefore specified.

Having thus described my improvement, I am aware that a carburet of iron for recarburization has been heretofore produced by a partial purification of pig metal by the use of oxides of iron, and do not herein claim the same, for the reason that such a pig varies from mine in this, that the metal is still a pig metal having substantially the original percentage of phosphorus present. I am also aware that in the refining of wrought-iron for the removal of sulphur and phosphorus the wrought-iron has been repeatedly recarburized and puddled, and in so doing an artificial pig or carburet of iron has been produced. Therefore I do not herein broadly claim an artificial or factitious pig; neither do I claim the production of cast-steel by mixing refined pig-iron with wrought-iron; but

What I do claim as my invention, and desire to secure by Letters Patent, is—

1. The method herein described for the manufacture of steel by the open-hearth or Siemens-Martin process, which consists in the following steps: first, the formation of the bath from a factitious pig practically free from phosphorus and sulphur; secondly, the decarburization of said bath; and, finally, the recarburization of the bath with said factitious pig, substantially as and for the purposes described.

2. In the manufacture of steel by the open-hearth process, the method herein described of obtaining a steel free from sulphur and phosphorus, which consists in first forming a bath from factitious pig, as herein specified, and substantially decarburizing and recarburizing said bath, substantially as and for the purpose described.

In testimony whereof I, the said W. A. OTTO WUTH, have hereunto set my hand.

WILLIAM AUGUST OTTO WUTH.

Witnesses:
C. E. MILLIKEN,
JOHN K. SMITH.